Aug. 9, 1938.  F. C. HUTCHISON ET AL  2,125,923
WELDING APPARATUS
Original Filed July 21, 1933
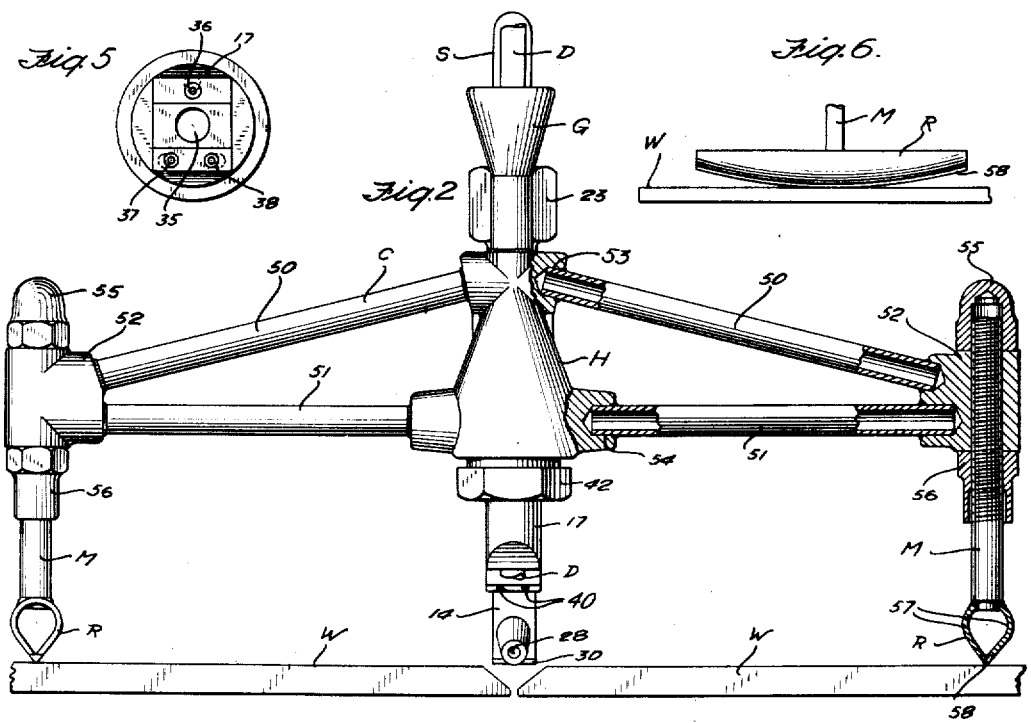
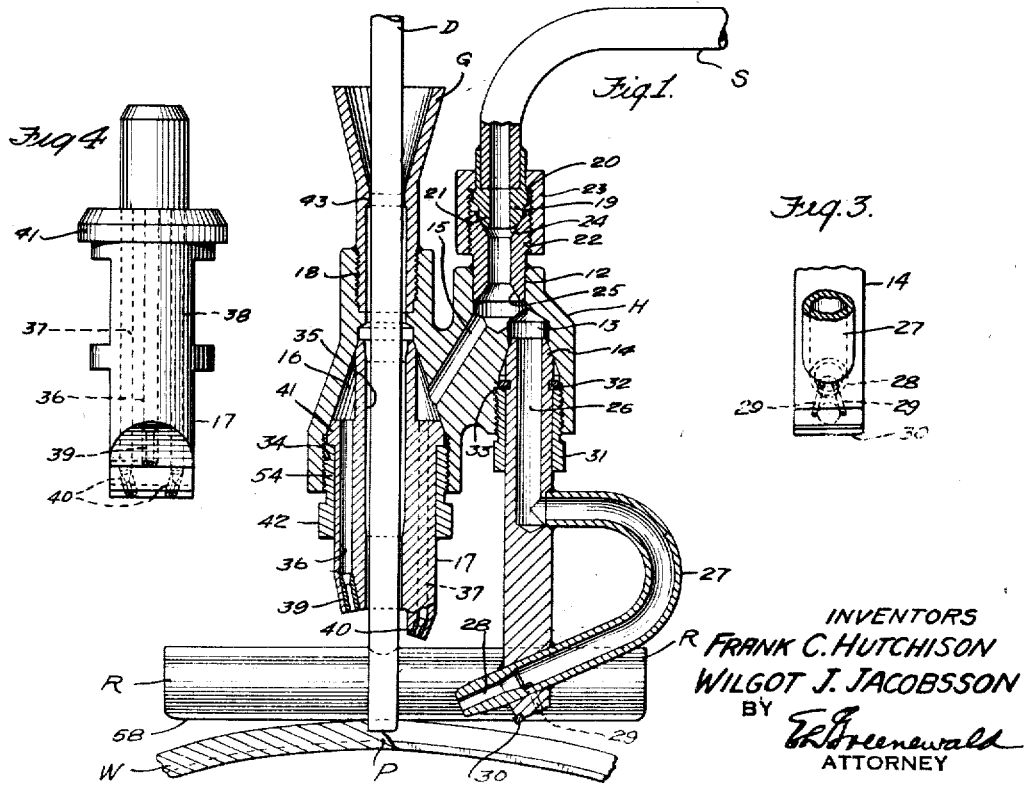
INVENTORS
FRANK C. HUTCHISON
WILGOT J. JACOBSSON
BY
ATTORNEY Patented Aug. 9, 1938

2,125,923

UNITED STATES PATENT OFFICE 2,125,923

WELDING APPARATUS

Frank C. Hutchison, Merriam, Kans., and Wilgot J. Jacobsson, Scotch Plains, N. J., assignors, by mesne assignments, to Union Carbide and Carbon Corporation, a corporation of New York Application July 21, 1933, Serial No. 681,570
Renewed February 24, 1938

25 Claims. (Cl. 113—59)

This invention relates to apparatus for welding purposes and more particularly relates to a preferred form of apparatus for increasing the speed of welding contiguous edges of metallic members.

An object of this invention is to provide an apparatus having a compact arrangement of jet-producing nozzles and an improved construction for distributing the gas to the nozzles for effectively welding metallic members at a rapid speed.

Another object of this invention is to provide a novel means for supporting a welding apparatus on the work.

A further object of this invention is to provide an improved apparatus for welding contiguous edges of metallic members without the use of a liner or backing shield and without the necessity of accurately aligning the edges of the members to be welded.

The above and other objects and the novel features of the invention will be more apparent from the following description and the accompanying drawing, of which Fig. 1 is a sectional view of the apparatus embodying this invention;

Fig. 2 is a front elevation of the apparatus showing, partially in section, the adjustable type of supporting member;

Fig. 3 is a view of the work preheating orifices in the main welding nozzle;

Figs. 4 and 5 are an elevation and an end view respectively of the rod preheating nozzle member; and Fig. 6 is a view of an alternative form of runner or work-contacting ski.

In accordance with this invention a welding apparatus has been devised which comprises a compact arrangement of nozzles formed in a novel manner and mounted in a gas distributing head H which is supported by a carriage C for guiding the apparatus over the work. A stem S of a usual design, having a chamber in which the combustible gases are mixed, is connected with the head H, and valves situated in a handle portion (not shown) of the stem S are employed in the common manner for controlling the supply of gas. Runners R may be provided on upright members M of the carriage C for sliding contact with the work W.

The head H is preferably a one-piece block of metal having openings to receive the nozzle members and passages for conducting gas to the entrances of the nozzles. An inlet 12 to the head H opens into a passage 13 leading directly to the main welding nozzle 14 and also opens into an inclined passage 15 leading rearwardly to a chamber 16 which communicates with passages in a rod preheating nozzle 17. An opening 18 through the head H above the chamber 16 furnishes a recess in which a rod guide G is secured for guiding a welding rod D to the work.

In order to make a gas tight connection between the end of the stem S and the inlet 12 in the head H a sleeve member 19, having a shoulder 20 and a rounded head 21, is soldered to the stem and cooperates with a nipple 22 which is soldered in the opening 12. The nipple 22 is preferably provided with external threads so that a rotatable nut 23 may be drawn up against the shoulder 20 of the sleeve member 19 and force the rounded head 21 against the sloping walls of a counterbore 24 in the passage of the nipple. A similar counterbore 25 at the lower end of the nipple 22 allows gas to flow readily to the passages 13 and 15 respectively without any turbulent effect such as might be caused by sharp corners.

The main welding nozzle 14 may comprise a relatively long rod member, having a passage 26 extending for approximately half the length thereof, and a bent tubing 27 leading from the lower end of the passage 26 in a downwardly and rearwardly sweeping arc. The tube at the lower end thereof is provided with a blowpipe tip having a large main welding orifice 28 adapted to deliver the main welding jet at a small acute angle with the perpendicular to the rod member or tangent to the work surface at the welding point or region. The arc in the tube 27 prevents a loss of velocity head and prevents eddies from being formed in the gas stream in making the change of direction. The orifice 28 of the blowpipe tip being properly constricted, the gas is discharged therefrom at the desired velocity and in a nonturbulent state. Substantially at right angles with the lower end of the tubing 27 and at an angle to the orifice 28, two small drillings 29 are made through the end of the rod member and into the passage of the tubing 27 in order to furnish jets for preheating the contiguous edges of the V in the work W. The preheat passages 29 being bored at right angles to the passage in tube 27, the pressure of the velocity head in the tube 27 is not effective in passages 29 and the necessary gas pressure in passages 29 is supplied by the back pressure resulting from the constricted orifice 28 and the portion of the bore tapering toward the orifice 28. Thus there is provided a plurality of lateral outlet passages 29 extending through the side wall of the tube 27 and communicating with the bore therein behind the tapering portion. This condition gives excellent gas distribution between the passages 29 and the orifice 28. The drillings 29 are preferably similar and smaller than the orifice 28, and are preferably made at an acute angle to one another and are arranged symmetrically in the same plane to direct the respective jets outwardly against each side of the V.

The lower end of the rod member of the nozzle 14 may be machined on a plane parallel to the tubing 27, where the latter passes through and is soldered to the rod member. The normal operating position of the apparatus with respect to round or flat surfaced work will thus bring the open end of the drillings 29 above the work and leave ample room for the formation of the small preheating jets. The extreme lower end of the rod member may be provided with a tip 30 of hard wearing material in order to prevent the nozzle 14 from becoming worn or bent by contact with the work. The tip 30 also serves to prevent the open ends of the drillings 29 from becoming shut off by contact with the weld V and causing flashbacks in the tubing 27. It is preferred to weld a small strip of material such as that which is commonly known as "Stellite" to the rod member.

The nozzle 14 may be held in the passage 13 in the head H by a hollow nut 31 which threadedly engages the tapped bore of the passage and bears against a compressible ring 32, fitting within a groove 33 in the surface of the upper or inlet end of the nozzle. Both the upper end of the nozzle 14 and the wall of the passage 13 above the threads are similarly chamfered so that the inlet end of the nozzle contacts with the wall of the passage over an appreciable area and prevents gas from leaking from the head.

In accordance with this invention a one-piece rod preheating nozzle member 17 is arranged within a relatively large opening 34, at the upper end of which the chamber 16 is formed when the nozzle 17 is fixed in place. A bore 35 through the vertical axis of the nozzle member 17 is aligned with the opening 18 in the head H so that the welding rod D may be directed to a point P a short distance behind the discharge orifice of the main welding nozzle 14 and near the lower edges of the work. The upper end of the bore 35 is enlarged so that the rod D may be inserted readily without striking against the corner of the nozzle member 17, and the lower end of the bore is slightly contracted in order that the rod will be held without appreciable lateral play near the welding point P. More than one jet of gas may be directed against the rod D from the nozzle member 17 and, as shown in Figs. 4 and 5, it is preferred to employ a passage 36 behind the rod for supplying one such jet at a small acute angle to the rod D and directed toward the point P. In front of the rod D it has been found advantageous to have two passages 37 and 38 extending through the length of the nozzle member 17 and opening a short distance below the level of the opening of the passage 36. Jets will be directed from these passages 37, 38 also at a small acute angle to the rod D and toward the point P. All three passages 36, 37 and 38 may be bent or provided with slanting bores in order to obtain the desired angles at which the jets are thrown against the rod D. In addition the lower ends of the passages 37 and 38, which are moderately spaced from one another through the greater portion of the length of the member 17, may be directed toward one another so that jets issuing from these passages will converge at the point P. It is preferred to insert in the ends of the passages small nipples 39 and 40 having restricted openings for increasing the velocity head of the gas and for forming properly shaped jets to produce effective heating flames.

The member 17 may be conveniently shaped so as to form inner walls for the annular chamber 16, which is amply large to deliver gas to the inlet ends of the passages 36, 37 and 38 respectively. An annular rim 41 on the member 17 adjacent the passage openings furnishes a means by which the member may be forced into the opening 34 as a hollow nut 42 bears against this rim and threadedly cooperates with a tapped area in the head H. Both the rim 41 and the edge of the upper end of the member 17 are chamfered at the same angle as the walls of the chamber 16 above the base of the threads in the opening 34, and a gas tight fit is assured when the member 17 is forced into place.

The rod guide G may comprise a funnel shaped member having a lower tubular portion which is adaptable to be fitted into the opening 18. A restriction 43 at the beginning of the tubular portion is so proportioned as to permit the passage of welding rods of a common standard size. The rod guide G may be provided with threads in order that it may be secured in a tapped area in the opening 18, and so that the guide G may be interchanged with others having differently sized restrictions 43 for accommodating welding rods of various diameters suitable for making heavier or lighter welds. However, the rod guide G may have an opening large enough to pass the largest sized rod and may be permanently secured to the head.

A carriage C supports the head H above the work and preferably comprises tubular braces 50 and 51, connecting the upper and lower portions of the head H with supporting blocks 52 which threadedly retain the upright members M, the members M being in the same plane with the axis of the welding rod D. The ends of the braces 50, 51 may be inserted in recesses 53 and 54 respectively in the head H and may be soldered to the head in rigid connection. Likewise the outer ends of the braces may be affixed to the supporting blocks 52. Great enough length is given to the upright members M so that they extend through the upper ends of the blocks 52 where lock nuts 55 may be employed to maintain the proper elevation of the apparatus for any particular welding operation. Additional hollow nuts 56 under the blocks 52 are an aid to locking the uprights M in position.

In further accord with this invention runners R are provided as contacting means between the uprights M and the work. A split tube, which has been shaped so that the edges 57 are drawn together by flattening the side walls of the tube, and the wall of the cylinder adjacent the edges serve as a bearing surface. The edges 57 of the tube are sealed and provided with a wearing surface 58 by applying a wear-resistant material, such as a coating of "Stellite". The wearing surface may be applied by fusing the "Stellite" to the tube in such a manner as to build up a durable knife-like edge which will give a freely sliding area of contact with the work. The runners R are preferably between four and six inches long and are secured to each of the upright members M by any convenient method such as by welding or soldering. In order to balance the additional weight of the apparatus which is concentrated toward the front, or toward the stem S, the upright members M may be secured to the runners at a point toward the rear from the exact center. With the members M so positioned in relation to the runners, the apparatus will remain upright when resting on a flat surface. For work having curved surfaces it has been found that a straight-edged runner is most suitable in that contact with the work is always assured although the apparatus may be moved with respect to the work and may also be tilted to direct the flames at different angles against the work. For plane surfaced work it is preferred to curve the runners, as shown in Fig. 6, so as to give a short area of contact and permit easy manipulation of the apparatus. In the claims the term "wear-resisting" is intended to include any metal, such as "Stellite", which is harder than ordinary steel.

In operating on different classes of work various combinations of nozzles may be employed depending on the width of the weld V and the thickness of the metal, but for general purposes the welding jet preferably should produce a flame of several times the volume and intensity of the work preheating and rod preheating jets, and the jets issuing against the front side of the welding rod should together produce an amount of heat substantially equivalent to that produced by the single jet behind the rod. In welding girth seams on curved surfaces such as pipes, the welding flame directed at an acute angle to a tangent to the surface at the welding point prevents the deposited metal from the welding rod from flowing through the V, seam or groove adapted to receive the weld metal and obviates the use of a liner. The angles at which the rod preheating jets are directed along the welding rod toward a point at the bottom of the rod and in line with the main welding jet tend to increase the rate of deposition of the rod metal and together with the action of the main welding jet and the work preheating jets speed up the rate of making a weld to a marked degree.

Although only one form of this invention has been illustrated and described it will be understood that changes may be made without departing from the scope of this invention.

We claim:

1. A manually operable apparatus for use in welding two members together along a seam, said apparatus comprising a gas distributing head; a guide having an opening for progressively directing a welding rod into the welding region; means for directing a jet of welding heat upon said region and for directing jets for preheating the work ahead of said region substantially at right angles to said jet of welding heat; a second means for directing jets against the front and rear sides of said welding rod; and means having a carriage for manipulating said apparatus with respect to the seam between said members.

2. A manually operable apparatus for use in welding two members together along a seam, said apparatus comprising a gas conducting head; a guide supported by said head and adapted to direct a welding rod into the welding region; means including an arcuate shaped tube for directing a comparatively large jet of welding heat upon said region at a small angle with a tangent to said seam at said region and for directing diverging jets against each side of the seam ahead of said region; a second means including an opening for the welding rod for directing a converging jet upon the front side and downwardly of said rod and for directing a jet downwardly upon the rear of said rod, all of said jets from the second means being directed into the welding region; and means for manipulating said apparatus with respect to the seam between said members.

3. A manually operable apparatus for use in welding two members together along a seam, said apparatus comprising a gas conducting head; a guide having an opening and being adapted to direct a welding rod into the welding region; means for directing a jet of welding heat upon said region and for directing jets for preheating the work ahead of said region substantially at right angles to said jet of welding heat; a second means for directing jets against the front and rear sides of the welding rod respectively and to converge substantially at the same point in the welding region as the jet of welding heat; and means including a carriage having comparatively long runners adapted to balance the apparatus on said members.

4. In an apparatus for use in welding two members together along a seam, the combination of a guide for directing a welding rod to a welding point; a member having a chamber therein disposed below said guide; a head for supplying combustible gas to a passage at the front of said apparatus and to said chamber; a nozzle connected to said passage and secured to the head, said nozzle being adapted to direct a welding jet along the seam at a small angle to the tangent thereto at the welding point; means including passages leading downwardly and outwardly from said nozzle for preheating the edges of the seam at a substantial distance ahead of the welding point; a second nozzle supported by the head and extending into said chamber, said nozzle being adapted to direct a plurality of jets along the front side and the rear side of the welding rod and towards the welding point; means including a carriage having relatively long runners for supporting the apparatus above the seam; and means for elevating the carriage with respect to said members.

5. In an apparatus of the class described; the combination of a gas distributing head having a passage in the front portion thereof and a chamber at the rear of the head; a main welding nozzle supported by the walls of said passage; a guide for directing a welding rod to a welding region, said guide being attached to the head above said chamber; and a nozzle member comprising a body having an opening adapted to receive and aid in guiding the welding rod, said member having at least one nozzle adapted to direct a heating jet on the welding rod and toward the welding region.

6. In an apparatus of the class described; the combination of a gas distributing head; a guide for directing a welding rod to a welding point in the work; a nozzle supported by the front of said head and adapted to direct a high temperature heating jet to the welding point and preheating jets in front of said point; a member having a plurality of passages for delivering jets to preheat the front and rear of the welding rod; a carriage having adjustable uprights for supporting said apparatus; and runners having relatively long edges of wear resisting material adapted to slide on the work.

7. In an apparatus of the class described; the combination of a gas distributing head; a guide for directing a welding rod to a welding point in the work; a nozzle supported by the front of said head and adapted to direct a high temperature heating jet to the welding point and preheating jets in front of said points; a member having a plurality of passages for delivering jets to preheat the front and rear of the welding rod; a carriage having adjustable uprights for supporting said apparatus, and runners having relatively long edges and being supported by said uprights at points a short distance ahead of the centers thereof.

8. In an apparatus of the class described; the combination of a gas distributing head; a guide for directing a welding rod to a welding point in the work; a nozzle supported by the front of said head and adapted to direct a high temperature heating jet to the welding point and preheating jets in front of said point; a member having a plurality of pasages for delivering jets to preheat the front and rear of the welding rod; a carriage having adjustable uprights for supporting said apparatus, and runners having a relatively long knife-edge on the under side thereof.

9. In an apparatus of the class described; the combination of a gas distributing head; a guide for directing a welding rod to a welding point in the work; a nozzle supported by the front of said head and adapted to direct a high temperature heating jet to the welding point and preheating jets in front of said point; a member having a plurality of passages for delivering jets to preheat the front and rear of the welding rod; a carriage having adjustable uprights for supporting said apparatus, and runners having a relatively long curved knife-edge on the under side thereof.

10. In an apparatus of the class described; the combination of a gas distributing head having a passage therein; a main welding nozzle comprising a rod having a gas passage in the upper end thereof, an arcuate shaped tube leading from said passage to the lower end of said rod and opening toward the rear of said apparatus, and means including passages leading downwardly and diverging outwardly from said tube for producing preheating jets.

11. In an apparatus of the class described; the combination of a gas distributing head having a passage therein; a main welding nozzle comprising a rod having a gas passage in the upper end thereof; an arcuate shaped tube leading from said passage to the lower end of said rod and having a main orifice opening toward the rear of said apparatus and provided with preheating jet forming means adjacent said orifice, and means supported by the lower end of said rod for maintaining said preheating jet means in spaced relation from the work.

12. In an apparatus of the class described; the combination of a gas distributing head; a guide for progressively directing a welding rod into a welding region; a member having a passage therethrough adapted to aid in guiding the rod, said member being arranged in the head in alignment with said guide; means associated with said member for directing preheating jets ahead of and behind the welding rod; and a carriage attached to said head and adapted to support said apparatus.

13. In welding apparatus, the combination of a gas distributing head having a gas passage, a nozzle comprising a member having an opening therethrough for guiding a welding rod toward the work, said member having a chamber encircling the opening and spaced therefrom and communicating with said first-mentioned passage, a plurality of gas conducting passages disposed within said member and communicating with said chamber and having outlets adapted to apply heating jets against said welding rod, and a second nozzle having a passage communicating with the passage in said head to provide a main welding flame at the welding point in the work.

14. In apparatus for welding a seam between metallic bodies, the combination of a welding head having a gas passage therethrough; a guide for directing a welding rod to the welding point; nozzles disposed in said rod guide and communicating with said gas passage for delivering a plurality of gaseous jets on a rod in said guide and onto the work at the point of welding; and a nozzle communicating with said gas passage and normally positioned to direct its jet at a slight angle to the work toward the forward portion of a puddle of molten metal in the seam so as to prevent the puddle from flowing forward in the seam.

15. In blowpipe apparatus, the combination of a distributing head provided with a main gas passage; a rod guide and a welding nozzle supported by said head; a preheating nozzle positioned to direct a jet upon a rod in the guide; branch passages leading from the main gas passage and communicating with the several nozzles; said nozzles being pivotally adjustable on said head so that the jets delivered thereby can be positioned in the same plane.

16. In blowpipe apparatus, the combination of a welding head; a tubular rod guide connected therewith for directing a rod to the welding point; a rod preheating nozzle and a welding nozzle adjustably connected respectively to said rod guide and said head so that the preheating nozzle and the welding nozzle are pivotally adjustable to discharge their jets in a plane including said rod guide.

17. In blowpipe apparatus, the combination of a welding member for providing welding heat in a welding region; a rod guide independent of and spaced from said welding member, said rod guide having a bore for directing a welding rod into said region; and a rod preheating member having a bore coaxial with that of said rod guide.

18. In welding apparatus, the combination of a nozzle having an opening therethrough, a welding rod guide detachably secured to said nozzle and interchangeable with other rod guides to accommodate welding rods of various sizes, such guide having an opening in alignment with the opening in said nozzle whereby the latter opening aids in guiding the welding rod toward the work, said nozzle being provided with at least one gas-conducting passage having an outlet inclined toward the axis of the rod guide opening so that the jet discharged thereby will impinge on the rod and be deflected toward the welding region.

19. A welding nozzle comprising a nozzle body having an axial bore extending therethrough and terminating in a single main orifice adapted to discharge a single welding jet against the surfaces to be welded, said bore having a portion thereof tapering toward said orifice; said body also having a plurality of lateral outlet passages extending through its side wall and communicating with said bore substantially at the rear end of such tapering portion, each of said outlet passages having a diameter smaller than said single main orifice and said plurality of outlet passages being located a substantial distance behind said main orifice and adapted to simultaneously apply preheating jets against both of the surfaces to be welded before said welding jet is applied to said surfaces.

20. A welding nozzle comprising a substantially tubular nozzle body having an axial bore extending therethrough and terminating in a single main orifice adapted to discharge a single welding jet against the work to be welded; said body also having a plurality of lateral outlet passages having axes angularly disposed with respect to the axis of said main orifice, said outlet passages extending through the side wall of said body and communicating with said bore, each of its axial outlet passages being located a substantial distance behind, and being of less cross-sectional area than, said main orifice and adapted to simultaneously apply preheating jets against both of the surfaces to be welded before said welding jet is applied to said surfaces, said bore having a tapering portion between said main orifice and the entrances of said outlet passages of sufficient length to produce a back pressure behind said main orifice adapted to provide a sufficient gas pressure at each of said entrances to force a steady gas stream out through each of said outlet passages.

21. A welding nozzle as claimed in claim 20, in which said plurality of outlet passages consists of two similar passages in the same plane and disposed at an angle to the axis of said bore.

22. A welding nozzle as claimed in claim 20, in which said plurality of outlet passages consists of two similar passages in the same plane and divergent from one another.

23. A welding nozzle comprising a substantially tubular nozzle body having an axial bore extending therethrough and terminating in at least one main orifice adapted to discharge a welding jet against the work to be welded; said body also having a plurality of outlet passages having axes angularly disposed with respect to the axis of said main orifice, said outlet passages extending through the side wall of said body and communicating with said bore, each of its axial outlet passages being located a substantial distance behind, and being of less cross-sectional area than, said main orifice and adapted to simultaneously apply preheating jets against both of the surfaces to be welded before said welding jet is applied to said surfaces, said bore being of sufficiently greater cross-section than said main orifice to produce a back pressure behind said main orifice adapted to provide a sufficient gas pressure at the entrance of each of said outlet passages to force a steady gas stream out through each of said outlet passages.

24. A welding nozzle comprising a substantially tubular nozzle body having an axial bore extending therethrough and terminating in a single main orifice adapted to discharge a single welding jet against the work to be welded; said body also having a plurality of lateral outlet passages, each of said outlet passages having a diameter smaller than said single main orifice and said plurality of outlet passages having their axes located in a plane angularly disposed with respect to the axis of said main orifice and located a substantial distance behind said main orifice and adapted to simultaneously apply preheating jets against both of the surfaces to be welded before said welding jet is applied to said surfaces, said bore having a tapering portion between said main orifice and the entrances of said outlet passages, said tapering portion being of sufficient length to produce a back pressure behind said main orifice adapted to provide a sufficient gas pressure at each of said entrances to force a steady gas stream out through each of said smaller outlet passages.

25. A blowpipe nozzle adapted to direct a gas jet at a relatively small acute angle to the work, comprising a substantially tubular member having a main axial passage extending therethrough and terminating in a gas outlet orifice; and passage means communicating with said main axial passage and provided with discharge orifice means having its axis angularly disposed with respect to the axis of said gas outlet orifice, the discharge orifice means of said passage means being spaced a substantial distance from the gas outlet orifice and adapted to direct diverging preheating jets on the work ahead of said gas jet.

FRANK C. HUTCHISON.
WILGOT J. JACOBSSON.

CERTIFICATE OF CORRECTION.

Patent No. 2,125,923.　　　　　　　　　　　　August 9, 1938.

FRANK C. HUTCHISON, ET AL.

It is hereby certified that error appears in the printed specification of the above numbered patent requiring correction as follows: Page 3, first column, line 60-61, claim 1, for the word "having" read including; line 73, claim 2, for "including" read having; page 4, first column, line 2, claim 7, for "points" read point; page 5, first column, lines 12 and 43, claims 20 and 23 respectively, for "said bore, each of its axial" read its axial bore, each of said; and that the said Letters Patent should be read with this correction therein that the same may conform to the record of the case in the Patent Office.

Signed and sealed this 15th day of November, A. D. 1938.

Henry Van Arsdale (Seal)　　　　　　　　　　　　　　　　　Acting Commissioner of Patents.

surfaces to be welded before said welding jet is applied to said surfaces.

20. A welding nozzle comprising a substantially tubular nozzle body having an axial bore extending therethrough and terminating in a single main orifice adapted to discharge a single welding jet against the work to be welded; said body also having a plurality of lateral outlet passages having axes angularly disposed with respect to the axis of said main orifice, said outlet passages extending through the side wall of said body and communicating with said bore, each of its axial outlet passages being located a substantial distance behind, and being of less cross-sectional area than, said main orifice and adapted to simultaneously apply preheating jets against both of the surfaces to be welded before said welding jet is applied to said surfaces, said bore having a tapering portion between said main orifice and the entrances of said outlet passages of sufficient length to produce a back pressure behind said main orifice adapted to provide a sufficient gas pressure at each of said entrances to force a steady gas stream out through each of said outlet passages.

21. A welding nozzle as claimed in claim 20, in which said plurality of outlet passages consists of two similar passages in the same plane and disposed at an angle to the axis of said bore.

22. A welding nozzle as claimed in claim 20, in which said plurality of outlet passages consists of two similar passages in the same plane and divergent from one another.

23. A welding nozzle comprising a substantially tubular nozzle body having an axial bore extending therethrough and terminating in at least one main orifice adapted to discharge a welding jet against the work to be welded; said body also having a plurality of outlet passages having axes angularly disposed with respect to the axis of said main orifice, said outlet passages extending through the side wall of said body and communicating with said bore, each of its axial outlet passages being located a substantial distance behind, and being of less cross-sectional area than, said main orifice and adapted to simultaneously apply preheating jets against both of the surfaces to be welded before said welding jet is applied to said surfaces, said bore being of sufficiently greater cross-section than said main orifice to produce a back pressure behind said main orifice adapted to provide a sufficient gas pressure at the entrance of each of said outlet passages to force a steady gas stream out through each of said outlet passages.

24. A welding nozzle comprising a substantially tubular nozzle body having an axial bore extending therethrough and terminating in a single main orifice adapted to discharge a single welding jet against the work to be welded; said body also having a plurality of lateral outlet passages, each of said outlet passages having a diameter smaller than said single main orifice and said plurality of outlet passages having their axes located in a plane angularly disposed with respect to the axis of said main orifice and located a substantial distance behind said main orifice and adapted to simultaneously apply preheating jets against both of the surfaces to be welded before said welding jet is applied to said surfaces, said bore having a tapering portion between said main orifice and the entrances of said outlet passages, said tapering portion being of sufficient length to produce a back pressure behind said main orifice adapted to provide a sufficient gas pressure at each of said entrances to force a steady gas stream out through each of said smaller outlet passages.

25. A blowpipe nozzle adapted to direct a gas jet at a relatively small acute angle to the work, comprising a substantially tubular member having a main axial passage extending therethrough and terminating in a gas outlet orifice; and passage means communicating with said main axial passage and provided with discharge orifice means having its axis angularly disposed with respect to the axis of said gas outlet orifice, the discharge orifice means of said passage means being spaced a substantial distance from the gas outlet orifice and adapted to direct diverging preheating jets on the work ahead of said gas jet.

FRANK C. HUTCHISON.
WILGOT J. JACOBSSON.

CERTIFICATE OF CORRECTION.

Patent No. 2,125,923. August 9, 1938.

FRANK C. HUTCHISON, ET AL.

It is hereby certified that error appears in the printed specification of the above numbered patent requiring correction as follows: Page 3, first column, line 60-61, claim 1, for the word "having" read including; line 73, claim 2, for "including" read having; page 4, first column, line 2, claim 7, for "points" read point; page 5, first column, lines 12 and 43, claims 20 and 23 respectively, for "said bore, each of its axial" read its axial bore, each of said; and that the said Letters Patent should be read with this correction therein that the same may conform to the record of the case in the Patent Office.

Signed and sealed this 15th day of November, A. D. 1938.

Henry Van Arsdale (Seal) Acting Commissioner of Patents.